US012635028B2

(12) United States Patent
Feng et al.

(10) Patent No.: US 12,635,028 B2
(45) Date of Patent: May 19, 2026

(54) DISTRIBUTED CONNECTION MANAGEMENT IN CLOUD SYSTEM

(71) Applicant: SAP SE, Walldorf (DE)

(72) Inventors: Dabin Feng, Shanghai (CN); Xia Yu, Shanghai (CN)

(73) Assignee: SAP SE, Walldorf (DE)

( * ) Notice: Subject to any disclaimer, the term of this patent is extended or adjusted under 35 U.S.C. 154(b) by 504 days.

(21) Appl. No.: 18/465,370

(22) Filed: Sep. 12, 2023

(65) Prior Publication Data

US 2025/0089118 A1     Mar. 13, 2025

(51) Int. Cl.
*H04W 76/00*      (2018.01)
*H04W 24/04*      (2009.01)
*H04W 76/20*      (2018.01)

(52) U.S. Cl.
CPC .......... *H04W 76/20* (2018.02); *H04W 24/04* (2013.01)

(58) Field of Classification Search
None
See application file for complete search history.

(56) References Cited

U.S. PATENT DOCUMENTS

| | | | |
|---|---|---|---|
| 11,647,081 B2 * | 5/2023 | Kasten | H04L 67/564 |
| | | | 709/227 |
| 2014/0113653 A1 * | 4/2014 | Wendling | H04W 68/02 |
| | | | 455/456.1 |
| 2014/0204816 A1 * | 7/2014 | Ismail | H04W 52/0258 |
| | | | 370/311 |

FOREIGN PATENT DOCUMENTS

| | | | | |
|---|---|---|---|---|
| CN | 109684397 | 4/2019 | | |
| CN | 105468619 | 10/2019 | | |
| EP | 2616966 B1 * | 10/2019 | | H04L 67/142 |
| WO | WO-2013086447 A1 * | 6/2013 | | H04W 4/12 |

* cited by examiner

*Primary Examiner* — Gerald A Smarth
(74) *Attorney, Agent, or Firm* — Fish & Richardson P.C.

(57)     ABSTRACT

Methods, systems, and computer-readable storage media for receiving a request that requires a connection to a database, wherein the application server is initially allocated with a set of base connections by a central server; determining that there are available idle connections based on a number of in-use connections and a number of allocated connections; in response to determining that there are available idle connections, assigning an idle connection to the request and updating the number of in-use connections; determining an in-use percentage using the number of in-use connections and the number of allocated connections; and executing one of: requesting new connections from the central server in response to determining that the in-use percentage satisfies an upper percentage threshold, and returning idle connections to the central server in response to determining that the in-use percentage satisfies a lower percentage threshold.

21 Claims, 5 Drawing Sheets

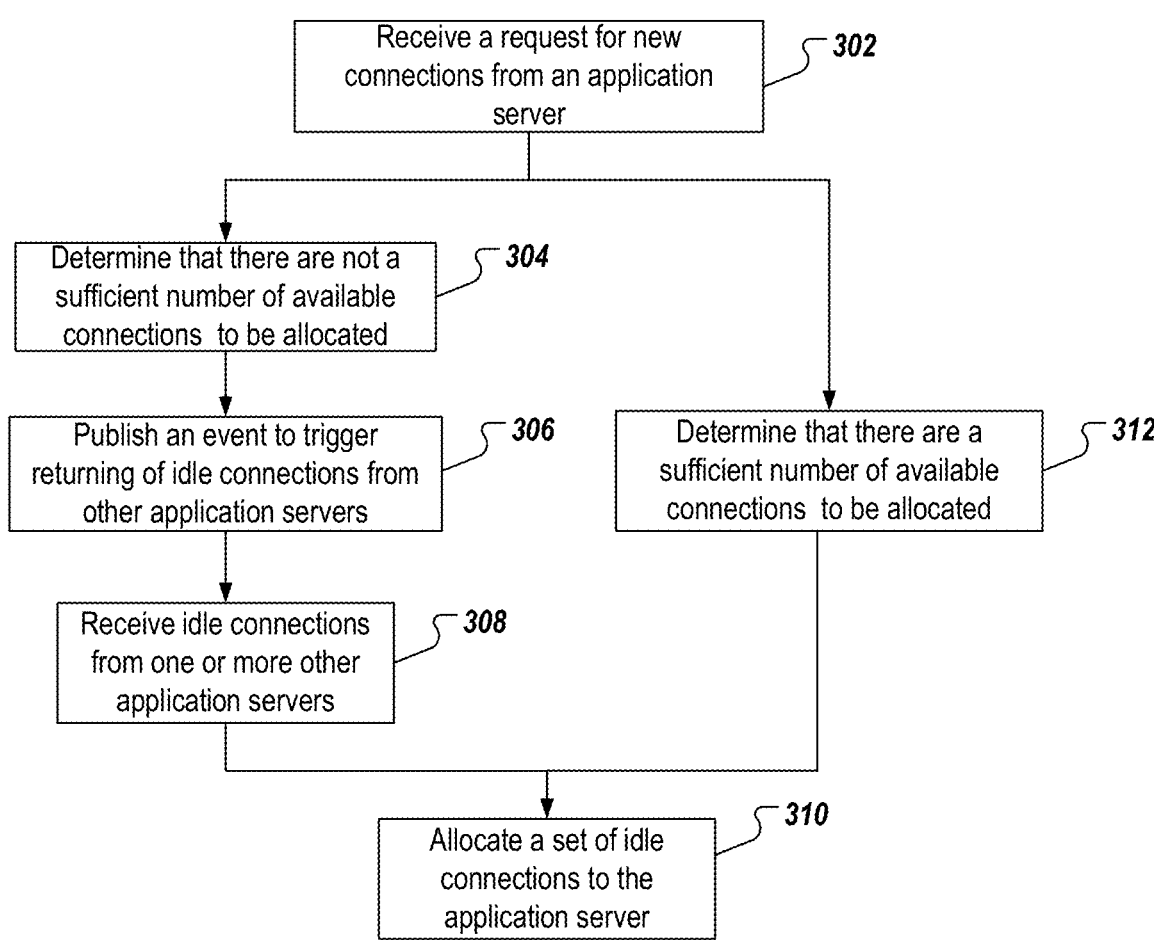

*300*

Receive a request for new connections from an application server ⟋ *302*

Determine that there are not a sufficient number of available connections to be allocated ⟋ *304*

Publish an event to trigger returning of idle connections from other application servers ⟋ *306*

Receive idle connections from one or more other application servers ⟋ *308*

Determine that there are a sufficient number of available connections to be allocated ⟋ *312*

Allocate a set of idle connections to the application server ⟋ *310*

*FIG. 3*

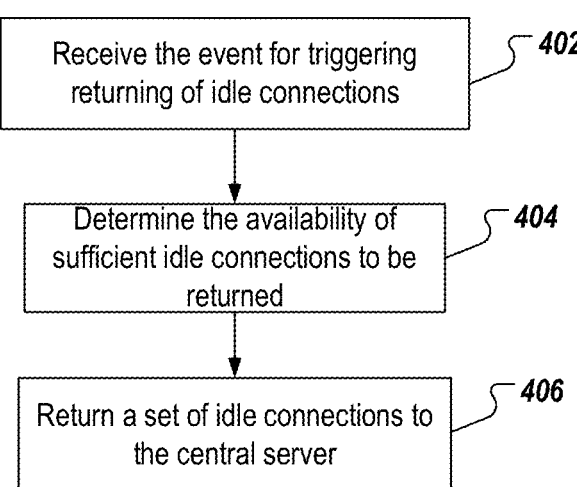
*400*
Receive the event for triggering returning of idle connections — 402
Determine the availability of sufficient idle connections to be returned — 404
Return a set of idle connections to the central server — 406
*FIG. 4*

DISTRIBUTED CONNECTION MANAGEMENT IN CLOUD SYSTEM

BACKGROUND

An increasing number of systems are being migrated to the cloud, predominantly adopting a multi-tenant software architecture. In this setup, multiple tenants can be assigned to an application server to process requests. Each application server is associated with a specific database connection pool within a data center. When an application programming interface (API) request is received, the system determines the appropriate database connection pool for the corresponding tenant and retrieves a database connection from that pool to carry out the necessary database operations. To accommodate high traffic volumes, a common practice in existing technologies is to assign a fixed number of database connections (also referred to as connections) to each application server. However, requests usually arrive unevenly among the multiple application servers. While load balancers can distribute API requests evenly across application servers, they lack visibility into whether the requests require database connections or how many connections are needed. Consequently, load balancers cannot ensure a balanced distribution of database requests within the cloud system. For instance, API requests directed to one application server (AS1) might exhaust all available database connections, while requests sent to another application server (AS2) may only utilize one or two connections. This results in AS1's allocated connections being fully utilized and subsequent requests needing to wait for available connections, while connections in AS2 remain idle. Described herein is a system and method to address these issues.

SUMMARY

Implementations of the present disclosure are directed to distributed connection management in cloud systems. More particularly, implementations of the present disclosure are directed to dynamically requesting new connections and/or returning idle connections based on the number of allocated connections and the number of in-use connections.

In some implementations, actions can include receiving, at an application server, a request that requires a connection to a database, wherein the application server is initially allocated with a set of base connections by a central server; determining that there are available idle connections based on a number of in-use connections and a number of allocated connections; in response to determining that there are available idle connections, assigning an idle connection to the request and updating the number of in-use connections; determining an in-use percentage using the number of in-use connections and the number of allocated connections; and executing one of: requesting new connections from the central server in response to determining that the in-use percentage satisfies an upper percentage threshold, and returning idle connections to the central server in response to determining that the in-use percentage satisfies a lower percentage threshold. Other implementations of this aspect include corresponding systems, apparatus, and computer programs, configured to perform the actions of the methods, encoded on computer storage devices.

These and other implementations can each optionally include one or more of the following features. In some embodiments, the application server can be associated with a max connection value that indicates a maximum number of connections that can be allocated to the application server.

In some implementations, the actions can include receiving new connections from the central server and updating the number of allocated connections, wherein the number of new connections is a predetermined percentage of the number of base connections.

In some implementations, the actions can include returning idle connections to the central server and updating the number of allocated connections, wherein the number of returned idle connections is a predetermined percentage of the number of base connections.

In some implementations, the central server can include a central connection pool including a plurality of connections, and the central server allocates connections from the central connection pool to multiple application servers. In some implementations, the central server can be configured to: receive the request for new connections from the application server; determine that there are not a sufficient number of available connections in the central connection pool; in response to determining that there are not a sufficient number of available connections to be allocated, publishing an event to trigger returning of idle connections from other application servers; receive idle connections from one or more other application servers; and allocate a set of idle connections to the application server.

In some implementations, the one or more other application servers can be configured to: receive the event for triggering returning of idle connections; determining an availability of sufficient idle connections to be returned; and in response to determining that there are sufficient idle connections to be returned, returning a set of idle connections to the central server.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts an example process for a central server managing connections, that can be executed in accordance with implementations of the present disclosure.

FIG. 4 depicts an example process of returning idle connections by application servers in response to a trigger event, that can be executed in accordance with implementations of the present disclosure.

Like reference symbols in the various drawings indicate like elements.

DETAILED DESCRIPTION

Implementations of the present disclosure are directed to distributed connection management in cloud systems. More particularly, implementations of the present disclosure are directed to dynamically requesting new connections and/or returning idle connections based on the number of allocated connections and the number of in-use connections.

Implementations can include actions of receiving, at an application server, a request that requires a connection to a database, wherein the application server is initially allocated with a set of base connections by a central server; determining that there are available idle connections based on a number of in-use connections and a number of allocated connections; in response to determining that there are available idle connections, assigning an idle connection to the request and updating the number of in-use connections; determining an in-use percentage using the number of in-use connections and the number of allocated connections; and executing one of: requesting new connections from the central server in response to determining that the in-use percentage satisfies an upper percentage threshold, and returning idle connections to the central server in response to determining that the in-use percentage satisfies a lower percentage threshold.

Implementations of the present disclosure provide methods and systems for managing distributed connection pools. The methods of systems described herein maximize the utilization of database connection resources to handle requests, thus preventing situations where one connection pool associated with an application server is excessively busy while others remain idle. The methods of systems described herein significantly enhance the system's throughput and efficiency.

Figure 1:
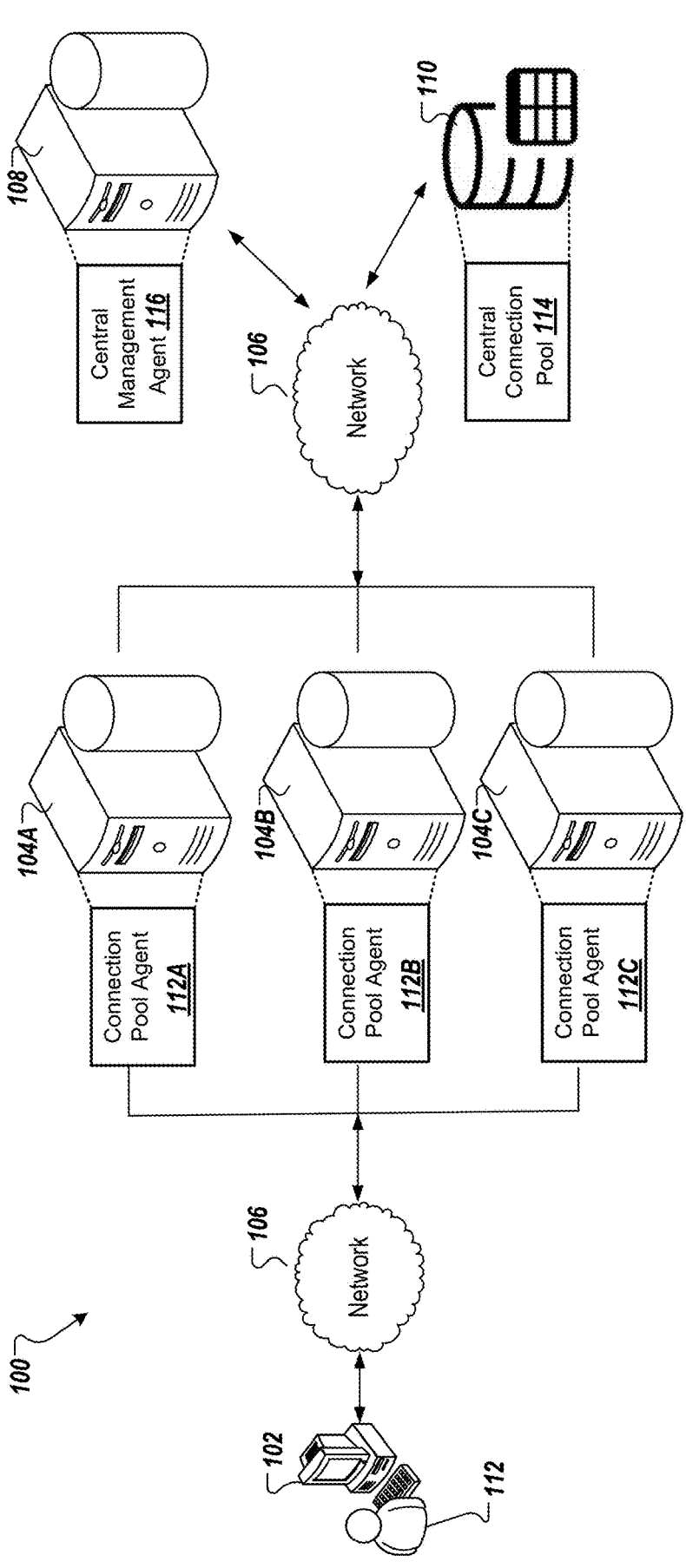
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, multiple application servers 104A, 104B, and 104C (collectively referred to as 104), and a central server 108. The application server 104 includes one or more server devices and databases (e.g., processors, memory). The central server 108 includes one or more server devices and databases. In the depicted example, a user 112 interacts with the client device 102.

In some examples, the client device 102 can communicate with the application servers 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each application server 104 includes at least one server device and at least one data store. In the example of FIG. 1, the application server 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, each application server 104 can host a connection pool agent 112 for dynamically requesting new connections and/or returning idle connections to a central connection pool 114 of a database system 110, based on the number of allocated connections and the number of in-use connections. The central server 108 can host a central management agent 116 that communicates with the connection pool agent of each application server 104. The central management agent manages the central connection pool of the database system 110 and assigns the connections of the central connection pool to the multiple application servers 104. Each agent can be provided as one or more computer-executable programs that are executed by one or more computing devices (e.g., a server). The technologies described herein include a proactive and intelligent method for managing distributed connection pools. By effectively utilizing the available database connection resources, the technologies described herein aim to address the issue of a single connection pool being overwhelmed while others remain idle. This approach greatly enhances the system's throughput by maximizing the utilization of database connection resources to handle incoming requests.

Figure 2:
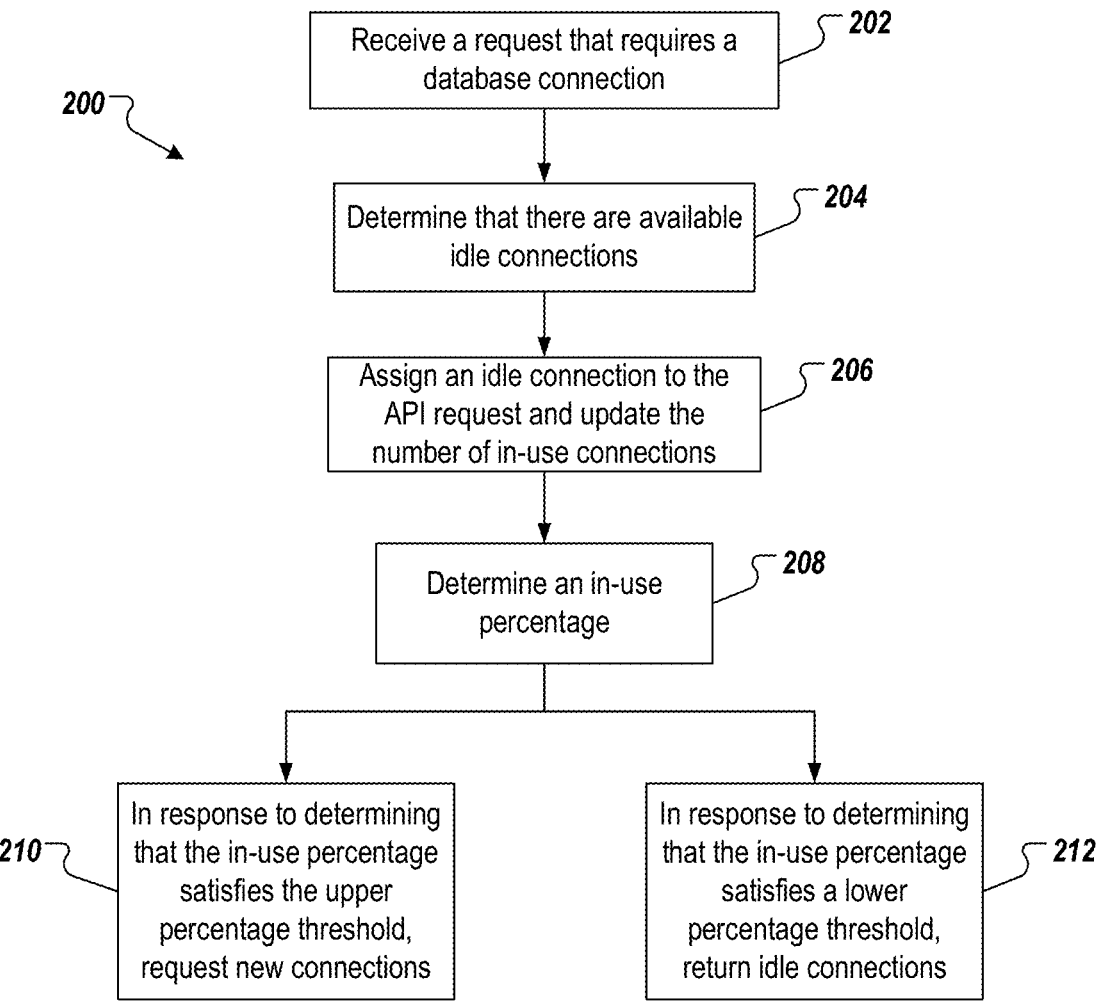
FIG. 2 depicts an example process for an application server managing connections, that can be executed in accordance with implementations of the present disclosure.

FIG. 2 depicts an example process 200 for an application server managing connections, that can be executed in accordance with implementations of the present disclosure. In some examples, the example process 200 is provided using one or more computer-executable programs executed by one or more computing devices.

At step 202, an application server receives a request that requires a database connection. The request can be an application programming interface (API) request that requires a connection to a cloud database. The application server can have an initial configuration including a predetermined number of base connections and a predetermined max connection value. The number of base connections is the number the database connections initially allocated to the application server by a central server. The central server manages a central connection pool and assigns the connections of the central connection pool to multiple application servers. Each application server is initially allocated with a set of base connections by the central server.

For example, the central connection pool can include 150 connections, and the central server can initially allocate 25 connections to each of multiple application servers that are associated with the same central server. The max connection value indicates the maximum number of connections that can be allocated to the application server. For example, the max connection value for the application server can be 75 connections.

In addition, the initial configuration of each application server can include an upper in-use percentage threshold for requesting addition connections from the central server and a lower percentage threshold for returning idle connections to the central server. More specifically, the upper in-use percentage threshold can be the threshold for allocating new connections from the central server. For example, if the percentage of the application server's in-use connections over the application server's allocated connections satisfies (e.g., is larger than or equal to) the upper in-use percentage threshold, the application server can request new connections from the central server. The lower percentage threshold can be the threshold for returning idle connections to the central server. For example, if the percentage of the application server's in-use connections over the application server's allocated connections satisfies (e.g., is smaller than or equal to) the lower percentage threshold, the application server can return idle connections to the central server.

At step 204, the application server determines that there are available idle connections based on the number of in-use connections and the number of allocated connections. The application server tracks the number of allocated connections number and the number of in-use connections. For example, if the application server has 25 allocated connections, and 10 connections are in use, there are 15 idle connections available.

At step 206, in response to determining that there are available idle connections, the application server assigns an idle connection to the request and updates the number of in-use connections. For example, if there are 15 idle connections available, the application server assigns an idle connection to the API request. As a result, the number of in-use connection is 11, and the number of idle connections is 14.

At step 208, the application server determines an in-use percentage using the number of in-use connections and the number of allocated connections. For example, after assigning an idle connection to the request, the number of in-use connections is increased by 1 while the number of idle connections is similarly decreased by 1. The application server determines an in-use percentage based on the updated in-use connection number and the allocated connection number. Specifically, the in-use percentage is the ratio of the number of in-use connections over the number of allocated connections. Based on whether the in-use percentage satisfies an upper percentage threshold or a lower percentage threshold, the application server can request new connections or return idle connections.

At step 210, in response to determining that the in-use percentage satisfies the upper percentage threshold, the application server requests new connections.

When the in-use percentage satisfies (e.g., is larger than or equal to) the upper percentage threshold, it indicates that a significant portion of the allocated connections are currently being utilized, and the remaining idle connections are approaching depletion. The application server can request new connections to be allocated to it. In some implementations, the number of newly allocated connections can be a predetermined percentage of the number of base connections. For example, the number of newly allocated connections can be 10% of the number of base connections (e.g., 10% of 25 connections which would be rounded up to 3 new connections). After receiving newly allocated connections from the central server, the application server can update the number of the allocated connections.

The central server can receive the request from the application server and allocate new connections to the application server. The process of allocating new connections to each application server is described in FIG. 3.

In some implementations, the application server further determines whether the number of its allocated connections is less than its max connection value. The max connection value indicates the maximum number of connections that can be allocated to the application server. If the number of allocated connections is less than the max connection value, the application server requests new connections.

At step 212, in response to determining that the in-use percentage satisfies a lower percentage threshold, the application server returns idle connections. When the in-use percentage satisfies (e.g., is smaller than or equal to) the lower percentage threshold, it is determined that a large portion of the allocated connections is not in-use and that the available idle connections are not being fully utilized. The application server can return idle connections to the central server. In some implementations, the number of returned idle connections can be another predetermined percentage of the number of base connections. For example, the number of returned idle connections can be 10% of the number of base connections (e.g., 10% of 25 connections rounded to 3 connections). After returning idle connections to the central server, the application server can update the number of the allocated connections.

In some implementations, the application server can periodically check the number of the in-use connections, the number of allocated connections, and whether the in-use percentage satisfies the upper or lower percentage thresholds. In other words, the application server can periodically execute the steps 206-210 based on a successive interval. The successive interval can be a predetermined period, such as every 10 minutes.

In some implementations, step 206 and step 210 can be periodically executed by the central server. Specifically, the central server can periodically check the number of the in-use connections, the number of allocated connections for each application server. If one application server's in-use percentage satisfies the lower percentage threshold, the central server can trigger the event for the returning of the idle connections from the application server.

FIG. 3 depicts an example process 300 for a central server managing connections, that can be executed in accordance with implementations of the present disclosure. In some examples, the example process 300 is provided using one or more computer-executable programs executed by one or more computing devices.

At step 302, the central server receives a request for new connections from an application server. As discussed above, when the in-use percentage satisfies (e.g., is larger than or equal to) the upper percentage threshold, it indicates that a significant portion of the allocated connections are currently being utilized, and the remaining idle connections are approaching depletion. The application server can request new connections from the central server. The central server can receive such a request.

At step 304, the central server determines that there are not a sufficient number of available connections in the central connection pool to be allocated, e.g., the unassigned or unallocated connections within the central connection pool cannot accommodate the requested new connections.

At step 306, in response to determining that there are not a sufficient number of available connections to be allocated, the central server publishes an event to trigger returning of idle connections from other application servers.

In some implementations, the central server can trigger the returning of the idle connections using an event broker.

Other application servers, which obtain connections from the same central server, can receive the published event and start returning their idle connections. The process of returning idle connections by the other application servers is described in FIG. 4.

At step 308, the central server receives idle connections from one or more other application servers. After the other application servers receive the trigger event, one or more of the other application servers return some of their idle connections, such as their idle connections.

The central server can receive the returned idle connections from the one or more other application servers. As a result, the number of available connections in the central connection pool is increased. If the other application servers do not have sufficient idle connections to return, the central server will wait for idle connections to become available.

At step 310, the central server allocates a set of idle connections to the requesting application server. After receiving the idle connections returned from the one or more other application servers, the central server can have a sufficient number of available connections in the central connection pool to accommodate the requested new connections. Consequently, the central server can allocate the required number of idle connections (e.g., the required number of new connections) to the application server. As discussed above, the required number of connections can be the predetermined percentage of the number of base connections of the application server. After allocating the set of idle connections, the central server can update the number of allocated connections in the central connection pool.

In some implementations, the central server further determines whether the application server's allocated connections will exceed its max connection value after receiving the new allocated set of idle connections and make sure the allocated connection does not exceed the max connection value.

At step 312, the central server determines that there are a sufficient number of available connections to be allocated, e.g., the unassigned or unallocated connections within the central connection pool can accommodate the requested new connections. In response to determining that there are a sufficient number of available connections in the central connection pool, the central server can allocate the required number of new connections to the application server, as discussed in step 310.

FIG. 4 depicts an example process 400 of returning idle connections by application servers in response to a trigger event, that can be executed in accordance with implementations of the present disclosure. In some examples, the example process 400 is provided using one or more computer-executable programs executed by one or more computing devices.

At step 402, a second application server receives the event for triggering returning of idle connections. The event can be received through an event broker. The second application server can be the other application servers that obtain connections from the same central server as the application server that requests new connections.

At step 404, in response to receiving the event, the second application server determines the availability of sufficient idle connections to be returned. Specifically, the second application server determines whether its number of idle connections satisfies an idle threshold. For example, the idle threshold can be 10% of its number of base connections.

At step 406, in response to determining that there are sufficient idle connections to be returned, the second application server returns a set of idle connections to the central server. For example, if the number of its idle connections is larger than or equal to 10% of its number of base connections, the second application server can proceed to return a set of its idle connections. The set of idle connections can be 10% of the number of base connections.

Figure 5:
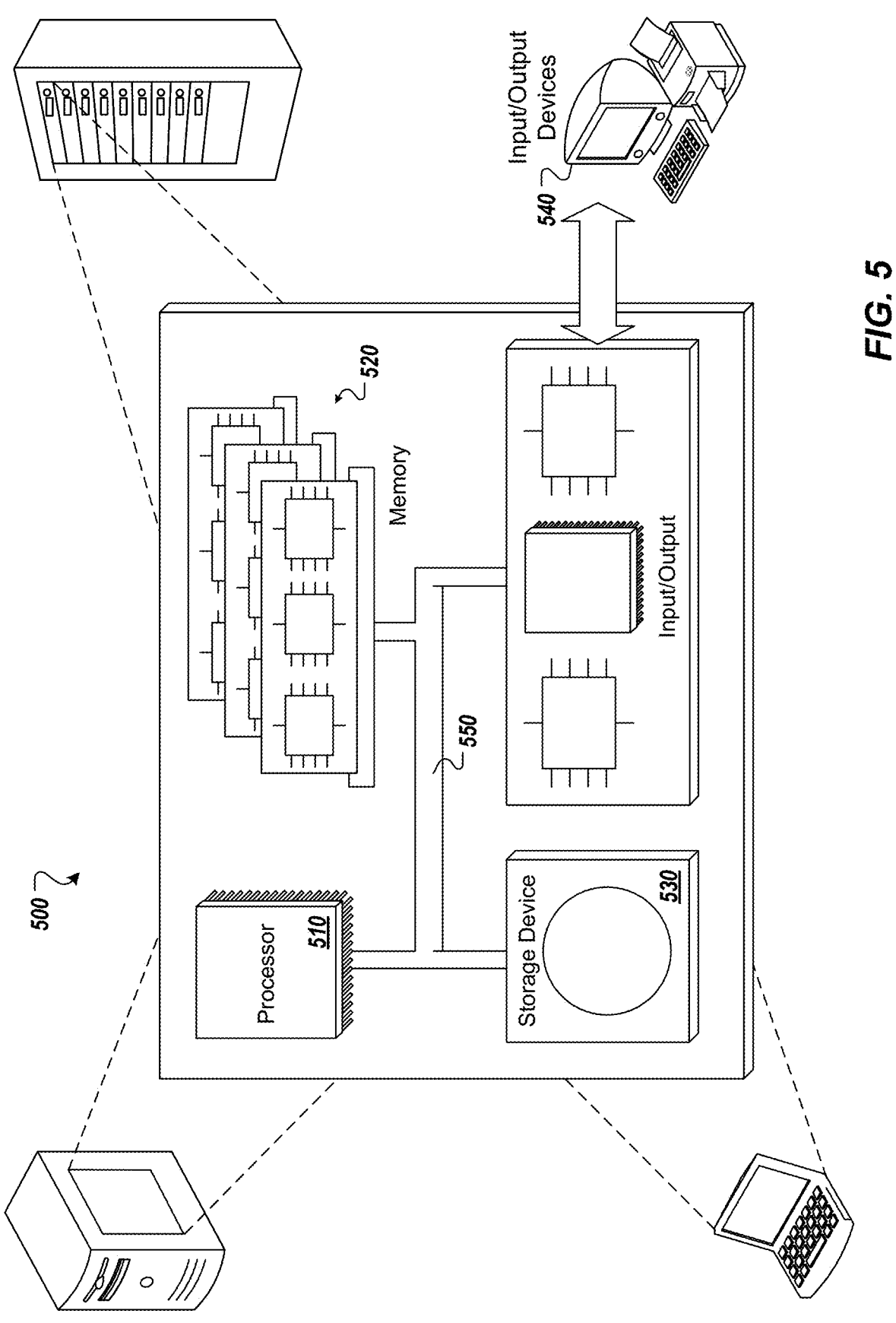
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for connection management in database systems, the method being executed by one or more processors and comprising:

receiving, at an application server, a request that requires a connection to a database, wherein the application server is initially allocated with a set of base connections by a central server;

determining that there are available idle connections based on a number of in-use connections and a number of allocated connections;

in response to determining that there are available idle connections, assigning an idle connection to the request and updating the number of in-use connections;

determining an in-use percentage using the number of in-use connections and the number of allocated connections; and executing one of:

requesting new connections from the central server in response to determining that the in-use percentage satisfies an upper percentage threshold, and returning idle connections to the central server in response to determining that the in-use percentage satisfies a lower percentage threshold.

2. The method of claim 1, wherein the application server is associated with a max connection value that indicates a maximum number of connections that can be allocated to the application server.

3. The method of claim 1, further comprising:

receiving new connections from the central server and updating the number of allocated connections, wherein the number of new connections is a predetermined percentage of the number of base connections.

4. The method of claim 1, further comprising:

returning idle connections to the central server and updating the number of allocated connections, wherein the number of returned idle connections is a predetermined percentage of the number of base connections.

5. The method of claim 1, wherein the central server comprises a central connection pool including a plurality of connections, and the central server allocates connections from the central connection pool to multiple application servers.

6. The method of claim 5, wherein the central server is configured to:

receive the request for new connections from the application server;

determine that there are not a sufficient number of available connections in the central connection pool;

in response to determining that there are not a sufficient number of available connections to be allocated, publishing an event to trigger returning of idle connections from other application servers;

receive idle connections from one or more other application servers; and allocate a set of idle connections to the application server.

7. The method of claim 6, wherein the one or more other application servers are configured to:

receive the event for triggering returning of idle connections;

determining an availability of sufficient idle connections to be returned; and in response to determining that there are sufficient idle connections to be returned, returning a set of idle connections to the central server.

8. A non-transitory computer-readable storage medium coupled to one or more processors and having instructions stored thereon which, when executed by the one or more processors, cause the one or more processors to perform operations for connection management in database systems, the operations comprising:

receiving, at an application server, a request that requires a connection to a database, wherein the application server is initially allocated with a set of base connections by a central server;

determining that there are available idle connections based on a number of in-use connections and a number of allocated connections;

in response to determining that there are available idle connections, assigning an idle connection to the request and updating the number of in-use connections;

determining an in-use percentage using the number of in-use connections and the number of allocated connections; and executing one of:

requesting new connections from the central server in response to determining that the in-use percentage satisfies an upper percentage threshold, and returning idle connections to the central server in response to determining that the in-use percentage satisfies a lower percentage threshold.

9. The non-transitory computer-readable storage medium of claim 8, wherein the application server is associated with a max connection value that indicates a maximum number of connections that can be allocated to the application server.

10. The non-transitory computer-readable storage medium of claim 8, the operations further comprising:

receiving new connections from the central server and updating the number of allocated connections, wherein the number of new connections is a predetermined percentage of the number of base connections.

11. The non-transitory computer-readable storage medium of claim 8, the operations further comprising:

returning idle connections to the central server and updating the number of allocated connections, wherein the number of returned idle connections is a predetermined percentage of the number of base connections.

12. The non-transitory computer-readable storage medium of claim 8, wherein the central server comprises a central connection pool including a plurality of connections, and the central server allocates connections from the central connection pool to multiple application servers.

13. The non-transitory computer-readable storage medium of claim 12, wherein the central server is configured to:

receive the request for new connections from the application server;

determine that there are not a sufficient number of available connections in the central connection pool;

in response to determining that there are not a sufficient number of available connections to be allocated, publishing an event to trigger returning of idle connections from other application servers;

receive idle connections from one or more other application servers; and allocate a set of idle connections to the application server.

14. The non-transitory computer-readable storage medium of claim 13, wherein the one or more other application servers are configured to:

receive the event for triggering returning of idle connections;

determining an availability of sufficient idle connections to be returned; and in response to determining that there are sufficient idle connections to be returned, returning a set of idle connections to the central server.

15. A system, comprising:

one or more hardware processors; and one or more computer memory devices interoperably coupled with the one or more hardware processors and having tangible, non-transitory, machine-readable media storing one or more instructions that, when executed by the one or more hardware processors, perform operations for connection management in database systems, the operations comprising:

receiving, at an application server, a request that requires a connection to a database, wherein the application server is initially allocated with a set of base connections by a central server;

determining that there are available idle connections based on a number of in-use connections and a number of allocated connections;

in response to determining that there are available idle connections, assigning an idle connection to the request and updating the number of in-use connections;

determining an in-use percentage using the number of in-use connections and the number of allocated connections; and executing one of:

requesting new connections from the central server in response to determining that the in-use percentage satisfies an upper percentage threshold, and returning idle connections to the central server in response to determining that the in-use percentage satisfies a lower percentage threshold.

16. The system of claim 15, wherein the application server is associated with a max connection value that indicates a maximum number of connections that can be allocated to the application server.

17. The system of claim 15, the operations further comprising:

receiving new connections from the central server and updating the number of allocated connections, wherein the number of new connections is a predetermined percentage of the number of base connections.

18. The system of claim 15, the operations further comprising:

returning idle connections to the central server and updating the number of allocated connections, wherein the number of returned idle connections is a predetermined percentage of the number of base connections.

19. The system of claim 15, wherein the central server comprises a central connection pool including a plurality of connections, and the central server allocates connections from the central connection pool to multiple application servers.

20. The system of claim 19, wherein the central server is configured to:

receive the request for new connections from the application server;

determine that there are not a sufficient number of available connections in the central connection pool;

in response to determining that there are not a sufficient number of available connections to be allocated, publishing an event to trigger returning of idle connections from other application servers;

receive idle connections from one or more other application servers; and allocate a set of idle connections to the application server.

21. The system of claim 20, wherein the one or more other application servers are configured to:

receive the event for triggering returning of idle connections;

determining an availability of sufficient idle connections to be returned; and in response to determining that there are sufficient idle connections to be returned, returning a set of idle connections to the central server.

* * * * *